United States Patent [19]

Matsui et al.

[11] Patent Number: 4,991,873
[45] Date of Patent: Feb. 12, 1991

[54] SLIDER STOPPING MECHANISM FOR AUTOMATIC SEATBELT SYSTEM

[75] Inventors: Kenji Matsui; Tatsuo Yamashita; Kazuyoshi Ishiguro; Toshikatsu Kondo, all of Aichi, Japan

[73] Assignee: Kabushiki Kaisha Tokai-Rika-Denki-Seisakusho, Niwa, Japan

[21] Appl. No.: 425,114

[22] Filed: Oct. 23, 1989

[30] Foreign Application Priority Data

Oct. 27, 1988 [JP] Japan .................................. 63-140125

[51] Int. Cl.$^5$ .............................................. B60R 22/06
[52] U.S. Cl. ...................................... 280/804; 16/95 R
[58] Field of Search ............... 280/804, 802, 801, 808; 297/469; 16/93 R, 93 D, 95 R, 95 D

[56] References Cited

U.S. PATENT DOCUMENTS

| 1,111,661 | 9/1914 | McCallum | 16/95 R |
|---|---|---|---|
| 4,324,419 | 4/1982 | Veda | 280/804 |
| 4,343,489 | 8/1982 | Suzuki et al. | 280/804 |
| 4,708,367 | 11/1987 | Yoshitsugu | 280/804 |
| 4,779,700 | 10/1988 | Kataoka | 280/804 |

Primary Examiner—Charles A. Marmor
Assistant Examiner—Karin Tyson
Attorney, Agent, or Firm—Sixbey, Friedman, Leedom & Ferguson

[57] ABSTRACT

A slider stopping mechanism for an automatic seatbelt system which is supported by a guide rail extending in a longitudinal direction of the vehicle and having a groove extending in the same direction and is adapted to stop the movement of a slider at one end of the guide rail so as to apply a webbing to a seat occupant or cancel the application thereof as the webbing is moved in the transverse direction by a driving apparatus. The slider stopping mechanism includes a switch inserted in the groove from the end portion and adapted to stop the driving of the driving apparatus when the slider reaches a predetermined position, as well as a shock-absorbing member which is disposed in the groove in such a manner as to be located adjacent to the switch and with which the slider is brought into contact. Hence, the slider is prevented from coming into direct contact with the switch.

20 Claims, 4 Drawing Sheets

CONVENTIONAL STRUCTURE

4,991,873

SLIDER STOPPING MECHANISM FOR AUTOMATIC SEATBELT SYSTEM

BACKGROUND OF THE INVENTION

1. Field of the Invention

The present invention relates to a slider stopping mechanism for an automatic seatbelt system for stopping a slider which moves while being guided by a guide rail secured to a roof side of a vehicle.

2. Description of the Related Art

In an automatic seatbelt system having a slider which moves by being guided by a guide rail secured to a roof side of a vehicle, an arrangement is such that when a seat occupant of the vehicle cancels the application of a webbing which he or she is wearing, the slider moves toward the front side of the vehicle to cause the slider to abut against a switch fixed to an end of the guide rail on the front side of the vehicle, thereby turning off the switch and stopping the slider.

With this type of slider stopping mechanism the arrangement is such that, as shown in FIG. 4, a switch 104 is disposed in a notch 102 provided in a tip portion of a guide rail 100, and secured to the guide rail 100 by means of a screw 106.

As such, with the conventional slider stopping mechanism for an automatic seatbelt system, machining work has been required, such as providing a notch in the guide rail 100 so as to secure the switch 104 to the guide rail 100.

In addition, there has been a drawback in that the conventional switch 104 is not only brought into direct contact with a sensor 104A of the switch 104 but also a switch body 104B. Thus, a large impact is disadvantageously exerted to the switch body 104B.

SUMMARY OF THE INVENTION

Accordingly, an object of the present invention is to provide a slider stopping mechanism for an automatic seatbelt system which requires little machining work to a guide rail for the securing of a switch and prevent a large impact from being exerted on the switch.

To this end, in accordance with the present invention, there is provided a slider stopping mechanism for an automatic seatbelt system for stopping the movement of a slider at one end portion of a guide rail, the automatic seatbelt system including the guide rail extending in a longitudinal direction of a vehicle and having a groove formed along the extending direction thereof; the slider, a part of which is supported by being accommodated in the groove in such a manner as to be movable in the longitudinal direction of the vehicle and by which one end of a webbing worn by a seat occupant of the vehicle is supported, and driving means for driving in such a manner as to move the slider to an opposite end portion of the guide rail in a longitudinal direction of the guide rail so as to fasten the webbing around the occupant or cancel the application thereof. The slider stopper mechanism: a switch which is inserted into the groove from a one end portion of the guide rail and adapted to stop the driving of the driving means when the slider is moved from the other end portion side of the guide rail and is located at a predetermined position in the vicinity of the one end portion of the guide rail; a shock-absorbing member which is disposed in the groove on the one end portion side of the guide rail in proximity to the switch and with which a part of the slider is brought into contact; and a movement hindering member which is adapted to engage with the shock-absorbing member in a direction toward one end portion of the guide rail as the part of the slider is brought into contact with the shock absorbing member.

In accordance with the present invention having the above-described arrangement, since the switch is secured by being inserted into the groove of the guide rail, a notch for securing the switch to the guide rail can be dispensed with, so that it becomes unnecessary to machine the guide rail for providing the notch in the guide rail.

In addition, since the slider is made to abut against the shock absorbing member by disposing the shock absorbing member in the groove in such a manner as to be located adjacent to the switch, it is possible to alleviate the shock applied to the switch.

The above and other objects, features and advantages of the present invention will become more apparent from the following detailed description of the invention when read in conjunction with the accompanying drawings.

BRIEF DESCRIPTION OF THE DRAWINGS

FIGS. 1 to 3 illustrate an embodiment of a slider stopping mechanism for an automatic seatbelt system in accordance with the present invention, in which FIG. 1 is an exploded perspective view;

FIG. 2 is a vertical cross sectional view;

FIG. 3 is an overall schematic diagram of the automatic seatbelt system; and

DESCRIPTION OF THE PREFERRED EMBODIMENT

Referring now to the accompanying drawings, a description will be given of an embodiment of the present invention.

Figure 3:
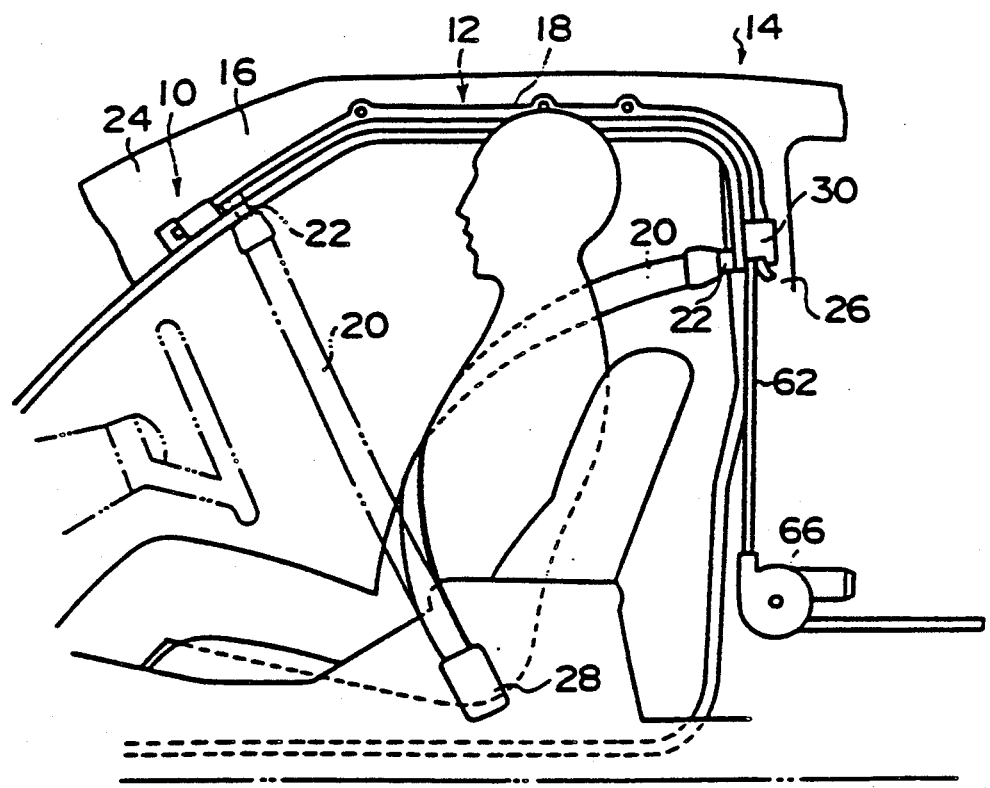
Figure 4:
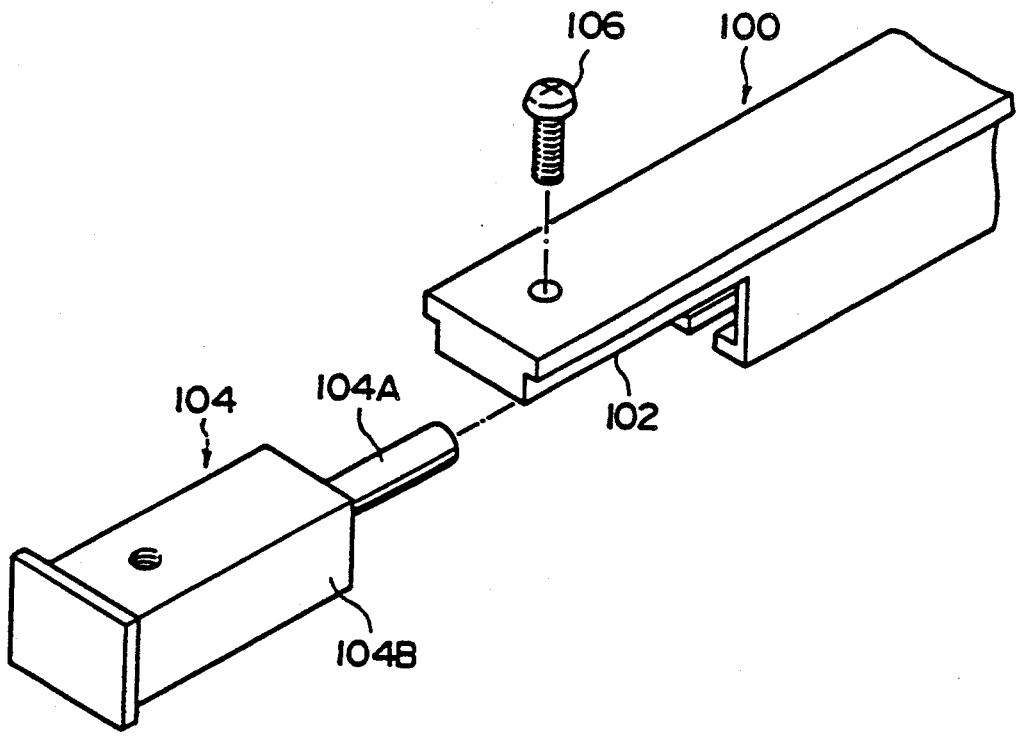
FIG. 4 is an exploded perspective view of a conventional slider stopping mechanism for an automatic seatbelt system.

FIG. 3 illustrates an automatic seatbelt system 12 to which a slider stopping mechanism for an automatic seatbelt system in accordance with an embodiment of the present invention is applied.

The automatic seatbelt system 12 has a guide rail 18 which is disposed along a roof side 16 of a vehicle 14 in such a manner as to extend in a longitudinal direction of the vehicle.

A front end side of the guide rail 18 extends along a front pillar 24 of the vehicle 14. A rearward end side thereof extends in such a manner as to be bent downward along a center pillar 16.

A slider 22 is supported by the guide rail 18 in such a manner as to be movable in a longitudinal direction thereof. The slider 22 is connected to a wire rope 62. This wire rope 62 is adapted to be moved in the longitudinal direction of the guide rail 18 by a driving apparatus 66 which is secured to a lower portion of the center pillar 26.

A webbing 20 which is worn by a seat occupant of the vehicle 14 has one end portion supported by the slider 22. The other end portion is taken up onto a takeup apparatus 28 in the form of a roll and accommodated therein. The takeup apparatus is disposed in a central portion of the vehicle. The takeup apparatus incorporates an unillustrated inertia lock mechanism for instantaneously preventing the drawing out of the webbing 20 by detecting a sudden deceleration of the vehicle by means of an unillustrated acceleration sensor at the time of the occurrence of an emergency situation.

A first slider stopping mechanism 10 for stopping the slider 22 on the front side of the vehicle is disposed on the front pillar 24. A second slider stopping mechanism 30 for stopping the slider 22 on the rear side of the vehicle is disposed on an upper portion of the center pillar 26.

Accordingly, when the wire rope 62 is driven by the driving apparatus 66 to move the slider 22 toward the rear side of the vehicle, and the rearward movement of the slider 22 is stopped by the second slider stopping mechanism 30, the webbing 20 assumes a state in which it is fastened around the occupant of the vehicle 14. On the other hand, when the wire rope 62 is driven by the driving apparatus 66 to move the slider 22 toward the front side of the vehicle, and the forward movement of the slider 22 is stopped by the first slider stopping mechanism 10, the webbing 20 assumes a state in which the application thereof to the occupant is canceled.

A description will now be given of the structure of the guide rail 18 and the slider 22.

Figure 1:
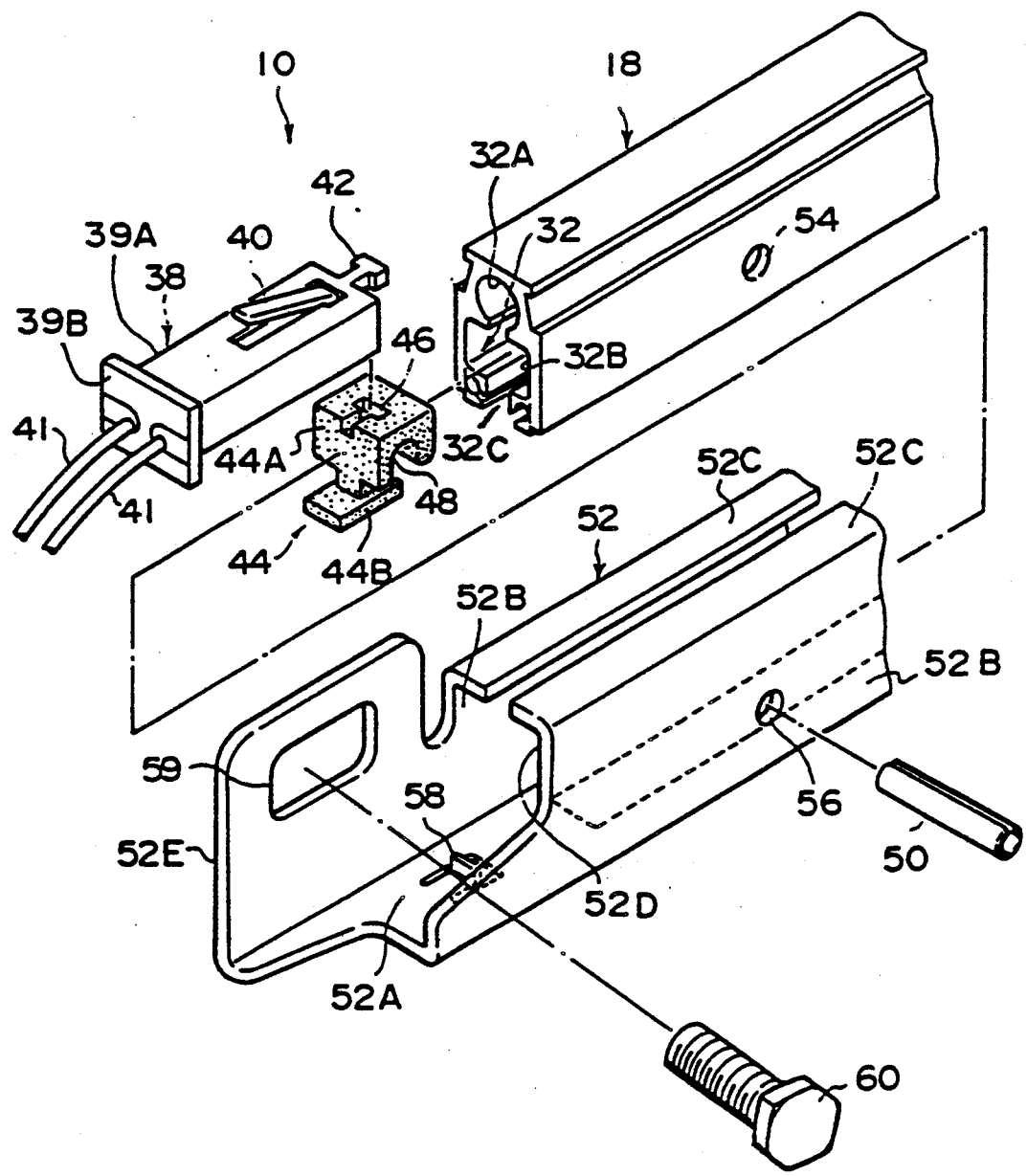

As shown in FIG. 1, a groove 32 is formed in the guide rail 18 in a longitudinal direction in such a manner as to be downwardly open. This groove comprises a first groove portion 32A having a substantially circular section, a second groove portion 32B communicating with the first groove portion 32A and having a substantially rectangular section, and a neck portion 32C allowing the second groove portion 32B to be open downwardly.

Figure 2:
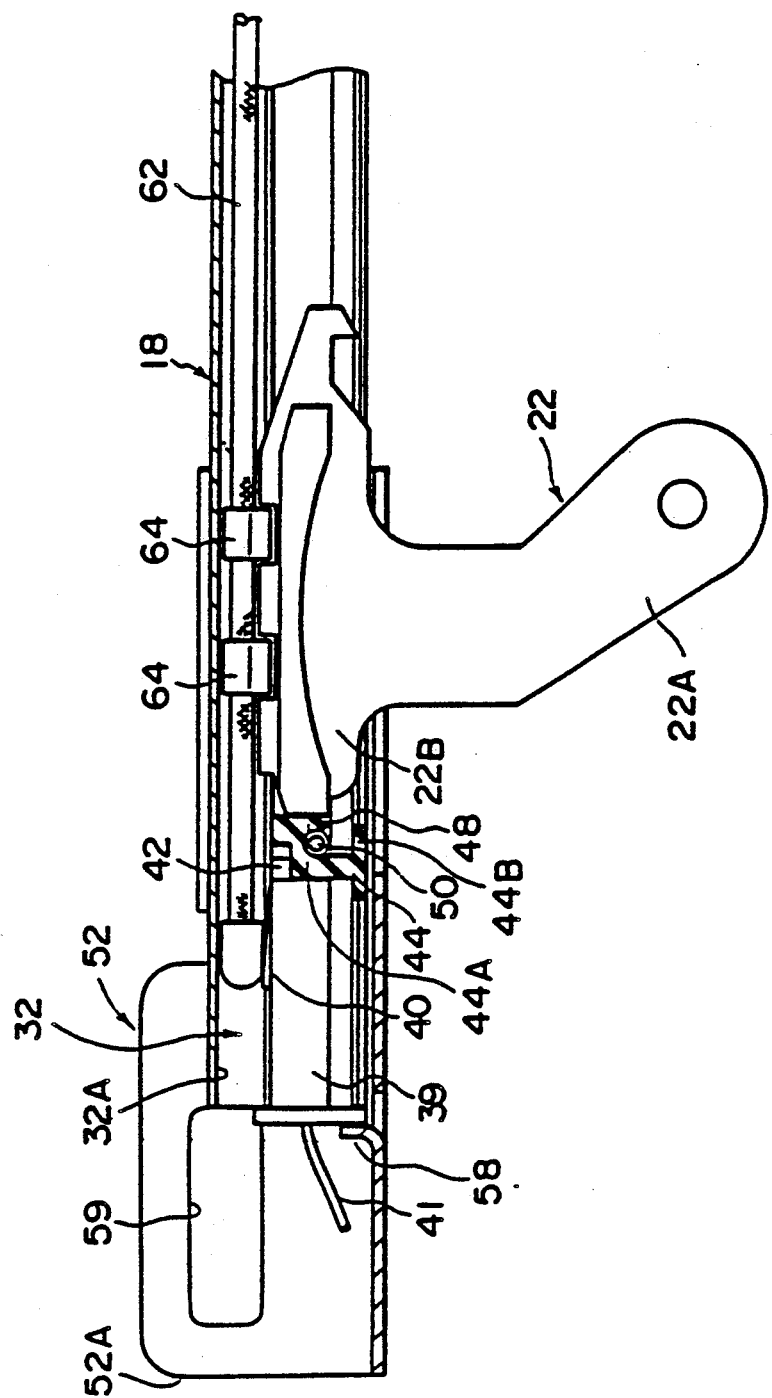

Meanwhile, as shown in FIG. 2, the slider 22 comprises a support portion 22A at which one end portion of the webbing 20 is retained. A sliding portion 22B is disposed in the second groove portion 32B and adapted to be movable along the longitudinal direction thereof. The wire rope 62, disposed in the first groove portion 32A in such a manner as to be movable in the longitudinal direction thereof, is connected to the sliding portion 22B of the first groove portion 32A side via a pair of fixing rings 64. As shown in FIG. 2, this connection is affected in such a manner that the end portion of the wire rope 62 on the front side of the vehicle is located more closely to the front side of the vehicle by a predetermined length than the end portion of the sliding portion 22B of the slider 22 on the front side of the vehicle.

A detailed description will now be given of the first slider stopping mechanism 10. It should be noted that since the second slider stopping mechanism 30 has a similar arrangement to that of the first slider stopping mechanism 10, a description of the second slider stopping mechanism 30 will be omitted.

A limit switch 38, for stopping the movement of the slider 22, is inserted in an end portion of the guide rail 18 from the front side of the vehicle. As shown in FIG. 1, this limit switch 38 comprises a rectilinear parallolopiped switch body 39A having a section smaller than the section of the second groove portion 32B and a substantially rectangular end plate 39B secured to one end face thereof and having a size greater than the section of the second groove portion 32B. Accordingly, the arrangement is such that when the switch body 39A is inserted into the second groove portion 32B, the peripheral portion of the end plate 39B is brought into contact with the end face of the guide rail 18, thereby allowing the switch body 39A to be positioned in place. A sensor piece 40 is provided on the switch body 39A for the first groove portion 32A side in such a manner as to project into the first groove portion 32A. The limit switch 38 is turned off as the sensor piece 40 is pressed downward from this projecting position. In addition, a pair of cords 41 for connecting the limit switch 38 and the driving apparatus 66 extend from the end plate 39B. Furthermore, a projection 42 having a T-shaped configuration as viewed from its top is formed on the other end of the switch body 39A (at the rear side of the vehicle). This projection 42 is fitted in a T-shaped recess 46 formed in a damper 44 which is disposed adjacent to the end of the limit switch 38 on the rear side of the vehicle.

This damper 44 is formed of a rubber material in this embodiment, and comprises a substantially rectilinear parallelopiped damper body 44A located in the second groove portion 32B and a leg portion 44B projecting from the damper body 44A and positioned in the aforementioned neck portion 32C. As shown in FIG. 2, this damper 44 is adapted to absorb the shock of collision with the slider 22 when the sliding portion 22B of the slider is brought into contact with the damper 44 when the slider 22 is moved in the forward direction of the vehicle.

In addition, as shown in FIG. 1, an inverted U-shaped groove portion 48, extending in the transverse direction of the guide rail 18, is formed in the damper body 44A, a slotted pin 50 being disposed in the groove portion 48. The slotted pin 50 is inserted through pin holes 54, 56 respectively formed in the guide rail 18 and a front bracket 52 which surrounds and reinforces the limit switch 38, the damper 44, and the guide rail 18 so as to secure the damper 44 and the front switch 38 within the guide rail 18.

The front bracket 52 comprises an elongated base plate portion 52A and a pair of leg plate portions 52B respectively extending from the transversely opposite sides thereof in the same direction at substantially right angles with the base plate portion 52B. The upper end portions of the leg plate portions 52B are bent in a direction in which they approach each other and are formed as bent portions 52C.

As a result, formed in the front bracket 52 is an accommodating portions 52D for accommodating the end portion of the guide rail 18 at the front end of the vehicle by means of the base plate portion 52A, the leg plate portions 52B, and the bent portions 52C.

In addition, the front bracket 52 has an extended portion 52E in which the longitudinal end portion of one of the leg plate portions 52B (the side of the front bracket 52 which is fixed to the vehicle 14) extends toward the front side of the vehicle. Formed in this extended portion 52E is an elongated hole 59 extending in the same direction as that of the extended portion 52E. A bolt 60 is inserted through this elongated hole 59 so as to allow the front bracket 52 to be adjustably fixed to the front pillar 24.

Furthermore, a cutout piece 58 is formed on a base portion 52A of the front bracket 52 in such a manner as to be cut out from a lower side of the base portion 52A. This cutout piece 58 serves to positively prevent the movement of the limit switch 38 in the forward direction of the vehicle as the cutout piece 58 is brought into contact with the end plate 39B of the limit switch 38 inserted in the guide rail 18.

A description will now be given of the procedure of assembling the slider stopping mechanism 10 to the guide rail 18.

First, projection 42 of the limit switch 38 is fitted into the recess portion 46 of the damper 44 to form the limit switch 38 and the damper 44 as a unit. Then, the switch body 39A of the limit switch 38 and the damper body 44A of the damper 44 are inserted as one into the second groove portion 32B of the guide rail 18 until the end plate 39B of the limit switch 38 is brought into contact with the end face of the guide rail 18. In this state, the pin holes 54 in the guide rail and the groove portion 48 of the damper 44 are opposed to each other, with the sensor piece 40 being positioned in the first groove portion 32A. At the same time, the leg portion 44B of the damper 44 is fitted into the neck portion 32C of the groove portion 32. Then, the guide rail 18 is inserted into the accommodating portion 52D of the front bracket 52 so that the pin holes 56 in the front bracket 52 oppose the pin holes 54 in the guide rail 18. In this state, a slotted pin 50 is inserted through the pin hole 56 in the front bracket 52, the pin hole 54 in the guide rail 18 on and, the groove portion 48 of the damper 44. The slotted pin 50 exists from the pin holes 56 and 54 on the opposite side.

As a result, the limit switch 38 and the damper 44 are secured to the front bracket 52 in the state in which the slotted pin 50 prevents them from moving. In this state, the cutout piece 58 of the front bracket 52 abuts against the end plate 39B of the limit switch 38 and is, together with the slotted pin 50, adapted to support a load acting on the limit switch 38 in the forward direction of the vehicle.

As described above, the end portion of the guide rail 18 toward the front side of the vehicle, in which the limit switch 38 is incorporated, is threadingly secured to the front pillar 24 of the vehicle 14 by a bolt 60 inserted through an elongated hole 59 in the extended portion 52E of the front bracket 52.

A description will now be given of the operation of the automatic seatbelt system 12 as described above.

In state in which the webbing 20 is worn by the occupant, the slider 22 is located at the end of the guide rail 18 on the rear side of the vehicle. The cancellation of the application of the webbing 20 fasten around the occupant in this state is affected by moving the webbing 20 toward the front side of the vehicle. Namely, the wire rope 66 is driven toward the front side of the vehicle by operating the driving apparatus 66. As the wire rope 66 thus moves, the slider 22 connected to the wire rope 66 also moves toward the front side of the vehicle.

When the slider 22 is moved up to a predetermined position and since the tip of the wire rope 62 connected to the sliding portion 22A of the slider 22 is located more closely to the front side of the vehicle than the tip of the sliding portion 22A, the tip of the wire rope 62 presses the sensor piece 40. As a result, the limit switch 38 is turned off, thereby stopping the driving apparatus 66 from driving the wire rope 62. In addition, substantially simultaneously with this stoppage, or slightly afterwards, the tip of the sliding portion 22A of the slider 22 is brought into contact with the damper 44. Thus, the movement of the slider 22 is stopped, and the webbing 20 is located at the position on the front side of the vehicle indicated by a two dotted chain line as shown in FIG. 3. This cancels the application of the webbing 22 being fastened around the occupant.

As described above, and in accordance with this embodiment, since a shock, which is produced as a result of coming into contact of the slider 22, is imparted to the guide rail 18 and the front bracket 52 by means of the slotted pin 50 supporting the damper 44, and since the damper 44 is formed of a rubber material, the shock is also absorbed by the damper 44 itself. Accordingly, since there is substantially no shock imparted to the limit switch 38, when brought into contact with the slider 22, it is possible to improve the durability of the limit switch 38.

As described above, in the slider stopping mechanism for an automatic seatbelt system in accordance with the present invention, since the switch is inserted into the guide rail, it is unnecessary to machine a fixing portion for fixing a switch by providing a notch in the guide rail, so that an advantage can be obtained in that the efficiency with which the guide rail is fabricated can be improved.

In addition, since a shock-absorbing member is connected to the switch, the present invention offers the advantage that the shock of contact of the slider can be reduced.

What is claimed is:

1. In an automatic seatbelt system including (a) an elongated guide rail extending in a longitudinal direction of a vehicle and having a groove formed along the longitudinal axis thereof, (b) a slider, a part of which is supported by being accommodated in said groove in such a manner as to be movable in the longitudinal direction of said vehicle and by which one end of a webbing worn by a seat occupant of said vehicle is supported, and (c) driving means for driving in such a manner as to move said slider to one end of said guide rail from an opposite end of said guide rail along the longitudinal axis of said guide rail so as to apply said webbing to said occupant or release the application thereof, a slider stopping mechanism for an automatic seatbelt system for stopping the movement of said slider at one end of said guide rail while simultaneously cushioning the impact of said slider against said slider stopping mechanism, comprising:

a switch which is inserted in one end of said groove from said one end of said guide rail and stops the driving of said driving means by switching when said slider is moved from said opposite end of said guide rail to a predetermined switch-triggering position in the vicinity of said one end of said guide rail;

a resilient shock-absorbing means which is fitted to and wholly disposed in said groove at said one end of said guide rail in proximity to said switch and with which said slider is brought into contact; and a movement hindering means which penetrates said shock-absorbing means so that at least a portion of said shock-absorbing means is interposed between said movement hindering member and said slider, and which is firmly anchored to at least said guide rail, said movement hindering means being able to hinder the movement of said shock-absorbing member in a direction toward said one end of said guide rail when said slider is brought into contact with said shock-absorbing member by the action of said driving means; wherein, said movement hindering means acts in combination with said shock-absorbing means and said switch upon impact of said slider to reliably and quietly stop said slider, while significantly minimizing shock of stopping impact of said slider by cushioning due to the interposition of said shock-absorbing means between said slider and said movement hindering means.

2. A slider stopping mechanism for an automatic seatbelt system according to claim 1, wherein said movement hindering means is constituted by a shaft member disposed by passing through two opposite walls forming said groove of said guide rail, as well as through the middle of said shock-absorbing means.

3. A slider stopping mechanism for an automatic seatbelt system according to claim 1, further comprising a bracket which is provided with an accommodating portion having a substantially U-shaped cross-section for accommodating and thereby reinforcing said one end of said guide rail, and a securing portion for securing said guide rail to said vehicle, said bracket functioning to improve the strength of said automatic seatbelt system and said slider stopping mechanism.

4. A slider stopping mechanism for an automatic seatbelt system according to claim 3, wherein respective ends of said movement hindering means are additionally anchored and supported by opposite walls of said U-shaped cross-section of said accommodating portion of said bracket, so as to strengthen said movement hindering means and said slider stopping mechanism.

5. A slider stopping mechanism for an automatic seatbelt system in accordance with claim 1, wherein said shock absorbing member is formed of a rubber material.

6. A slider stopping mechanism for an automatic seatbelt system in accordance with claim 1, wherein said groove has a first groove portion located at a bottom of said groove and a second groove portion which communicates with said first groove portion and is located at an open side of said groove, said switch being inserted in said second groove portion.

7. A slider stopping mechanism for an automatic seatbelt system in accordance with claim 6, wherein said switch has an actuating piece extending into said first groove portion and adapted to stop said driving means from being driven by being pressed.

8. A slider stopping mechanism for an automatic seatbelt system in accordance with claim 7, further comprising a wire rope disposed in said first groove portion which is connected to said one portion of said slider, and is adapted to drive said slider by moving in said first groove portion along the longitudinal axis of said guide rail.

9. A slider stopping mechanism for an automatic seatbelt system in accordance with claim 8, wherein said wire rope is connected to said part of said slider in such a manner that a tip of said wire rope is located closer to said one end of said guide rail by a predetermined distance than a tip of said slider.

10. A slider stopping mechanism for an automatic seatbelt system in accordance with claim 3, wherein said bracket has a hindering piece for hindering the movement of said switch out of position in a direction away from said opposite end of said guide rail and toward said one end thereof, if and when said switch reaches an extremity of said one end of said guide rail.

11. A slider stopping mechanism for an automatic seatbelt system in accordance with claim 1, wherein said switch and said shock-absorbing means are connected to each other by means of a connecting portion.

12. A slider stopping mechanism for an automatic seatbelt system in accordance with claim 11, wherein said connecting portion comprises a projection formed in one of said switch and said shock-absorbing means and a recess formed in the other and adapted to receive said projection.

13. In an automatic seatbelt system including (a) an elongated guide rail extending in a longitudinal direction of a vehicle and having a groove formed along the longitudinal axis thereof, (b) a slider, a part of which is supported by being accommodated in said groove in such a manner as to be movable in the longitudinal direction of said vehicle and by which one end of a webbing worn by a seat occupant of said vehicle is supported, and (c) driving means for driving in such a manner as to move said slider to one end of said guide rail toward the rear end of said vehicle so as to apply said webbing to said occupant and to move said slider to the other end of said guide rail toward the front end of said vehicle so as to release the application thereof, a slider stopping mechanism for an automatic seatbelt system for stopping the movement of said slider at said other end of said guide rail toward the front end of said vehicle, comprising:

a switch which is inserted in one end of said groove from said one end of said guide rail on the front side of said vehicle and stops the driving by said driving means by switching when said slider is moved from the other end of said guide rail on the rear side of said vehicle to a predetermined switch-triggering position;

a resilient shock-absorbing means which is fitted to and wholly disposed in said groove at said one end of said guide rail in proximity to said switch and with which said slider is brought into contact;

a bracket which has an accommodating portion for accommodating and thereby reinforcing said one end of said guide rail on the front end side of said vehicle and a securing portion for securing said guide rail to said vehicle, said bracket functioning to improve the strength of said automatic seatbelt system and said slider stopping mechanism; and a shaft member which penetrates said shock-absorbing means so that at least a portion of said shock-absorbing means is interposed between said shaft member and said slider, is firmly anchored to said guide rail, and has opposite end portions supported by said bracket, said shaft member being able to hinder the movement of said shock-absorbing means in a direction toward said one end of said guide rail on the front side of said vehicle when said slider is brought into contact with said shock-absorbing member by the action of said driving means; wherein, said shaft member acts in combination with said shock-absorbing means and said switch upon impact of said slider to reliably and quietly stop said slider, while significantly minimizing shock of stopping impact of said slider by cushioning due to the interposition of said shock-absorbing means between said slider and said shaft member.

14. A slider stopping mechanism for an automatic seatbelt system in accordance with claim 13, wherein said shock-absorbing means is formed of a rubber material.

15. A slider stopping mechanism for an automatic seatbelt system in accordance with claim 13, wherein said groove has a first groove portion located at a bottom of said groove and a second groove portion communicated with said first groove portion and located at an open side of said groove, said switch being inserted in said second groove portion.

16. A slider stopping mechanism for an automatic seatbelt system in accordance with claim 15, wherein said switch has an actuating piece extending into said first groove portion and adapted to stop said driving means from being driven by being pressed.

17. A slider stopping mechanism for an automatic seatbelt system in accordance with claim 16, further comprising a wire rope which is disposed in said first groove portion, is connected to said one portion of said slider, and is adapted to drive said slider by moving in said first groove portion in the longitudinal direction of said guide rail.

18. A slider stopping mechanism for an automatic seatbelt system in accordance with claim 17, wherein said wire rope is connected to said part of said slider in such a manner that a tip of said wire rope is located closer to said one end of said guide rail on the front end side of said vehicle by a predetermined distance than a tip of said slider, said part of said slider being brought into contact with said shock absorbing member simultaneously as said actuating piece is pressed by a tip of said wire rope at the earliest.

19. A slider stopping mechanism for an automatic seatbelt system in accordance with claim 13, wherein said bracket has a hindering piece for hindering the movement of said switch out of position in a direction away from said other end of said guide rail on the rear side of said vehicle and toward said one end thereof on the front side of said vehicle, if and when said switch reaches an extremity of said one end of said guide rail.

20. A slider stopping mechanism for an automatic seatbelt system in accordance with claim 13, wherein said switch and said shock-absorbing means are connected to each other by means of a connecting portion.

* * * * *